(12) United States Patent
Van Wyk et al.

(10) Patent No.: US 9,239,709 B2
(45) Date of Patent: Jan. 19, 2016

(54) METHOD AND SYSTEM FOR AN INTERFACE CERTIFICATION AND DESIGN TOOL

(75) Inventors: Ryan Van Wyk, Chesterfield, MO (US); Craig Auer, St. Louis, MO (US); Josh Barnickol, Maryland Heights, MO (US); Andrew Leasck, St. Charles, MO (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 1348 days.

(21) Appl. No.: 12/480,947

(22) Filed: Jun. 9, 2009

(65) Prior Publication Data

US 2010/0312542 A1 Dec. 9, 2010

(51) Int. Cl.
*G06F 9/44* (2006.01)
*G06Q 10/00* (2012.01)

(52) U.S. Cl.
CPC .. *G06F 8/38* (2013.01); *G06F 8/10* (2013.01); *G06Q 10/00* (2013.01)

(58) Field of Classification Search
CPC ........ G06F 9/455; G06F 11/3664; G06F 8/38
USPC ............... 703/22; 709/202, 230; 702/122, 68; 714/38, 25; 705/7; 717/135
See application file for complete search history.

(56) References Cited

U.S. PATENT DOCUMENTS

| | | | |
|---|---|---|---|
| 6,889,160 B2* | 5/2005 | Sabiers et al. | 702/122 |
| 2003/0191590 A1* | 10/2003 | Narayan et al. | 702/68 |
| 2003/0200348 A1* | 10/2003 | Humphries | 709/310 |
| 2004/0056894 A1* | 3/2004 | Zaika et al. | 345/762 |
| 2004/0199818 A1* | 10/2004 | Boilen et al. | 714/25 |
| 2004/0243338 A1* | 12/2004 | Sabiers et al. | 702/122 |
| 2004/0267485 A1* | 12/2004 | Penov et al. | 702/119 |
| 2005/0267976 A1* | 12/2005 | Chang et al. | 709/230 |
| 2006/0041879 A1* | 2/2006 | Bower et al. | 717/162 |
| 2006/0150026 A1* | 7/2006 | Kolawa et al. | 714/38 |
| 2006/0195546 A1* | 8/2006 | Hulse et al. | 709/217 |
| 2007/0255604 A1* | 11/2007 | Seelig | 705/7 |
| 2007/0277158 A1* | 11/2007 | Li et al. | 717/135 |
| 2007/0294586 A1* | 12/2007 | Parvathy et al. | 714/38 |
| 2008/0059558 A1* | 3/2008 | Singh et al. | 709/202 |
| 2008/0103923 A1* | 5/2008 | Rieck et al. | 705/26 |
| 2008/0151767 A1* | 6/2008 | Moran et al. | 370/252 |
| 2008/0154663 A1* | 6/2008 | Savur et al. | 705/7 |

(Continued)

OTHER PUBLICATIONS

Mamoon Yunus, "Introduction to Web Services Simulation with SOAPSimulator: a Hands-on Tutorial," Apr. 2008, http://www.codeproject.com/kb/showcase/SOAPSimulator.aspx, pp. 1-11.*

(Continued)

*Primary Examiner* — Kamini S Shah
*Assistant Examiner* — Russ Guill
(74) *Attorney, Agent, or Firm* — Fay Kaplun & Marcin, LLP

(57) ABSTRACT

Described herein are methods and systems for an interface certification and design tool. An exemplary embodiment is a computer readable storage medium including a set of instructions executable by a processor, the instructions operable to receive a selection of packaged software components. The set of instructions operable to generate a simulator default response for the software component, validate user changes to the simulator default response to create a validated test file, execute at least one simulator using the validated test file, and publish the validated test file.

20 Claims, 2 Drawing Sheets

(56) References Cited

U.S. PATENT DOCUMENTS

| | | | |
|---|---|---|---|
| 2008/0295075 A1* | 11/2008 | Janson | 717/120 |
| 2009/0006897 A1* | 1/2009 | Sarsfield | 714/38 |
| 2009/0089039 A1* | 4/2009 | Shufer et al. | 703/23 |
| 2009/0300655 A1* | 12/2009 | Hougland et al. | 719/319 |

OTHER PUBLICATIONS

S. Hanna et al., "an approach for specification-based test case generation for web services," 2007, IEEE/ACS International Conference on Computer Systems and Applications, pp. 16-23.*

Evan Martin et al., "Automated testing and response analysis of web services," 2007, IEEE International Conference on Web Services, eight pages.*

Xiaoying Bai et al., "WSDL-based automatic test case generation for web services testing," 2005, IEEE International Workshop on Service-oriented system engineering, pp. 1-6.*

Johannes Meinecke et al., "Enabling architecture changes in distributed web-applications," Oct. 31, 2007, Fifth Latin American Web Conference 2007, pp. 92-99.*

Graham Huges et al., "Client and server verification for web services using interface grammars," Jul. 21, 2008, TAV-WEB Workshop on Testing, Analysis and Verification, seven pages.*

Tevfik Bultan et al., "Client and server verification for web services using interface grammars," Jul. 21, 2008, Power Point Presentation at (TAV-WEB 2008) Workshop on Testing, Analysis and Verification, 34 pages.*

Cesare Bartolini et al., "WS-TAXI: a WSDL-based testing tool for web services," Apr. 1, 2009, ICST 2009 International Conference on Software Testing Verification and Validation, pp. 326-335.*

* cited by examiner

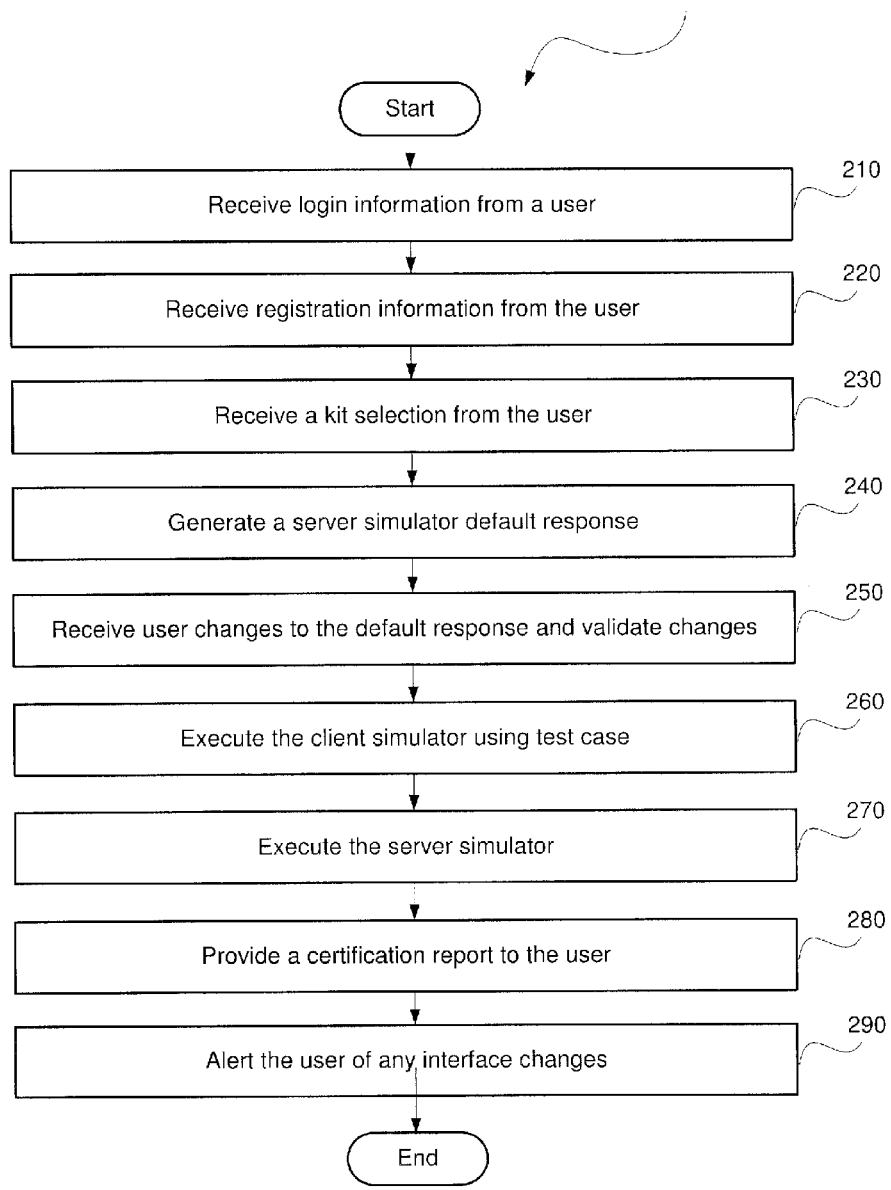

METHOD AND SYSTEM FOR AN INTERFACE CERTIFICATION AND DESIGN TOOL

BACKGROUND

The term "Web 2.0" describes a changing trend in the use of Internet technology (e.g., the World Wide Web), such as within the area of web design. Accordingly, the intent of a Web 2.0 application may generally be to enhance creativity and communications through securely sharing information, thereby improving the collaboration and functionality of the World Wide Web. Various Web 2.0 concepts have led to the development and continuous evolution of specific web communities and hosted services, such as, for example, social-networking sites, video hosting/sharing sites, "wiki" pages, and user blogs. Although the term implies a new version of the World Wide Web, it does not refer to an update of any technical specifications, but rather to changes in the ways software developers and end-users utilize the Web.

Within the area of web design, a markup language may be described as an artificial language using a set of annotations to text that give instructions regarding the structure of text or how it is to be displayed. Extensible Markup Language ("XML") is a general-purpose specification for creating custom "meta" markup languages. XML is classified as an extensible language, since it allows the user to define the mark-up elements. In other words, as a meta-language, users of XML may create an extensible set of tags, as needed, and then describe those tags and their permitted uses. Accordingly, the purpose of XML is to aid information systems in sharing structured data, such as the Internet. Furthermore, XML allows users to encode documents and to serialize data. An XML Schema Definition ("XSD") may be described as a type of XML document, wherein the XSD is typically expressed in terms of constraints on the structure and content of documents of that type. These constraints are more strenuous than the basic syntactical constraints imposed by XML itself. Thus, an XML schema provides a view of the document type at a relatively high level of abstraction.

Web Services Description Language ("WSDL") is an XML-based language that provides a model for describing network services. Specifically, WSDL may describe network services as a set of endpoints operating on messages containing information such as document-oriented data or procedure-oriented data. The operations and messages are described abstractly and then bound to a concrete network protocol and message format in order to define an endpoint. The endpoint, or port, may be defined by associating a network address with a reusable binding, and a collection of ports may define a service. The abstract definition of ports and messages are separated from their concrete use or instance, allowing the reuse of these definitions. Accordingly, messages are abstract descriptions of the data being exchanged, and port types are abstract collections of supported operations. The concrete protocol and data format specifications for a particular port type may constitute a reusable binding, whereas the operations and messages may then bound to a concrete network protocol and message format to define an endpoint. In this way, WSDL is extensible to allow description of endpoints and their messages regardless of what message formats or network protocols are used to communicate.

SUMMARY OF THE INVENTION

The present invention is generally related to methods and systems for an interface certification and design tool. One exemplary embodiment is related to a computer readable storage medium including a set of instructions that are executable by a processor, the set of instructions being operable to receive, from a user, a selection of one of a plurality of packaged software components. The selected packaged software component includes at least one of a plurality of simulators, test data files, and interface agreements of a provider web service. The set of instructions is further operable to generate a simulator default response for the selected packaged software component, validate user changes to the simulator default response to create a validated test file, execute at least one simulator using the validated test file, and publish the validated test file, wherein other users have access to the published validated test file.

A further exemplary embodiment is related to a system including a means for receiving a selection of one of a plurality of packaged software components from a user, the packaged software components including at least one of a plurality of simulators, test data files, and interface agreements of a provider web service, a means for generating a simulator default response, a means for validating user changes to the simulator default response to create a validated test file, a means for executing the at least one simulator using the validated test file, and a means for publishing the validated test file, wherein other users have access to the published validated test file.

A further exemplary embodiment relates to a system having a computer-readable memory storing executable modules and a processor executing the stored executable modules. The execution of the modules by the processor is to receive, from a user, a selection of one of a plurality of packaged software components, the selected packaged software component including at least one of a plurality of simulators, test data files, and interface agreements of a provider web service, generate a simulator default response for the selected packaged software component, validate user changes to the simulator default response to create a validated test file, execute at least one simulator using the validated test file and publish the validated test file, wherein other users have access to the published validated test file.

BRIEF DESCRIPTION OF THE DRAWINGS

FIG. 2 shows an exemplary method for designing and certifying user interfaces of a web-based application according to an exemplary embodiment of the present invention.

DETAILED DESCRIPTION

Figure 1:
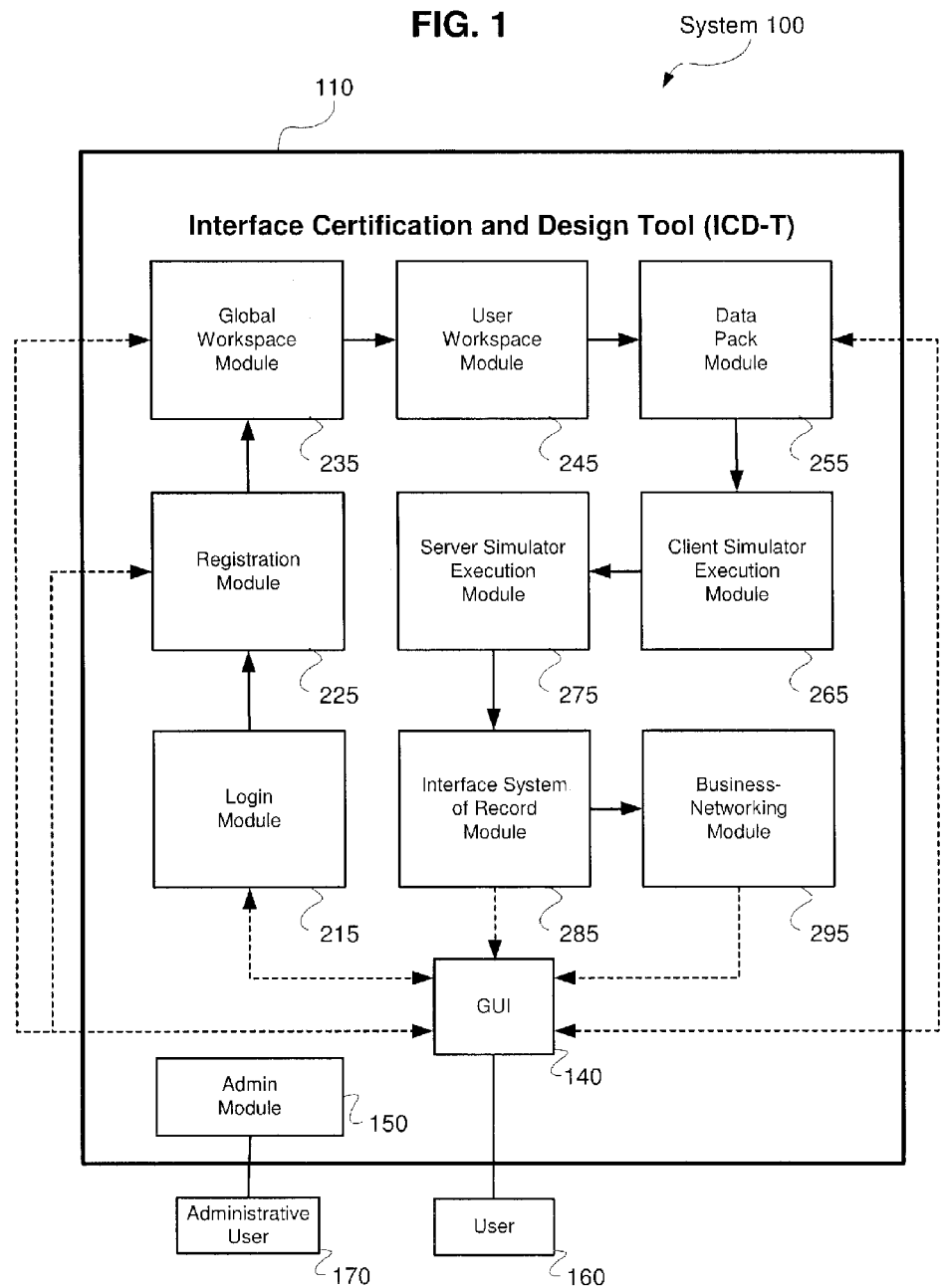
FIG. 1 shows an exemplary system for performing project management, capacity management, and time and cost creation across systems and departments for the lowest levels of data according to an exemplary embodiment of the present invention.

The exemplary embodiments of the present invention may be further understood with reference to the following description and the related appended drawings, wherein like elements are provided with the same reference numerals. The exemplary embodiments of the present invention are related to systems and methods for designing and certifying user interfaces. Specifically, the exemplary embodiments are related to systems and methods for standardizing formats and designs of user interfaces for web-based applications. Furthermore, the exemplary embodiments may utilize a web-based information technology ("IT") application tool, such as an interface certification and design tool ("ICD-T"), for improving the quality of user interfaces, for enforcing interface standards, and for allowing software developers and testers to easily create, share, and test these interfaces in real-time. Accordingly, the ICD-T may certify these interfaces for alignment of implementation into an overall interface design.

According to an exemplary embodiment of the present invention, the ICD-T may allow a user to reference an interface between multiple systems and view that interface in a suitable view, such as, for example, XML format, table format, pseudocode/form view, etc. In addition to the interfaces, the user may also view available interface simulators, documentation and connectivity information, and pre-defined request/response structures (e.g., "reactions"). A reaction may be defined as a canned simulator response that may be returned to a user upon the reception of a request message that matches pre-defined keys. The user may create new reactions in the ICD-T and publish the reactions to the simulator in order to support application testing. Accordingly, these user-created reactions may be validated in real-time to ensure compliance with standards (e.g., interface standardization). Since the ICD-T offers the ability for users to work in multiple views (e.g., XML view and pseudocode/form view), both expert and novice users may work with complex interfaces.

Furthermore, the ICD-T may be tester-friendly (e.g., useable to one with limited XML/WSDL knowledge) and developer-friendly (e.g., allow one to work in a preferred format, such as XML). In addition, the ICD-T may provide for schema validation of message creation, as well as helpful feedback/guidance to the user creating the message. Accordingly, the exemplary ICD-T may support both simulation of a provider system interface as well as simulation of a client system. In other words, the ICD-T may provide the user with real-time access to manipulate response message in a simple, user-friendly manner. Therefore, the ICD-T eliminates the need for a developer to make changes to simulator data (e.g., canned data), thereby reducing response times.

It should be note that while the exemplary ICD-T may simulate client transactions, the ICD-T also introduces the concept of community networking. As will be described in greater detail below, the ICD-T may include a library that allows users to share validated reactions from their respective workspace for other users to copy and edit into their own workspace.

FIG. 1 shows an exemplary system 100 for designing and certifying user interfaces of a web-based application according to an exemplary embodiment of the present invention. According to the exemplary embodiments, the system 100 may feature an application tool, such as an ICD-T 110, wherein the components of the ICD-T 110 may include a graphical user interface ("GUI") 140, and an admin portal 150 and several modules. Specifically, the ICD-T 110 may be accessible to both a user 160 (e.g., a customer) via the GUI 140 and an administrative user 170 (e.g., service provider personnel) via the admin portal 150. According to one embodiment of the present invention, an exemplary GUI 140 may feature Web 2.0 capabilities.

As will be described in detail below, the ICD-T 110 may enable the user 160 to test with the various modules, view predefined data, and self-map additional data, as needed. In addition, the ICD-T 110 may serve as a tester workspace for scenario-based testing. A scenario may be defined as a collection of reactions that span more than one of the simulators, wherein the scenario may mimic a flow-through of a multi-step business case. Accordingly, the ICD-T 110 may be used for integration testing with the scenario-based testing. A test, or "test case", may be an XML request that simulates a user application by exercising either a simulator instance or a real provider application.

The ICD-T 110 may be a web-based piece of software for standardizing the format and design of interfaces. These interfaces may be viewable in any appropriate format, such as an XML view, a pseudocode/form view, etc. The web-based software of the ICD-T 110 may allow for schema validation to prevent the user 140 from creating invalid messages. Furthermore, the ICD-T 110 may allow for real-time publication of reactions to the simulators. Thus, the reactions may be tested immediately, without requiring developer intervention. The ICD-T 110 may further provide for validation of the simulators in order to ensure alignment to an interface design. It should be noted that the ICD-T 110 may be preloaded with predefined testing scenarios (e.g., scenario maps) having correlated data (e.g., associated XML files).

As noted above, the exemplary ICD-T 110 may include a plurality of modules. For instance, the ICD-T 110 may include a login module 215 for ensuring that the user 160 exists on a database of the system 100. In addition, the ICD-T 110 may include a registration module 225 to allow the user 160 to self-register with a user profile in an inactive state.

Other modules may include workspace modules, such as a global workspace module 235 and a user workspace module 245. The global workspace module 235 may allow for searching and displaying a plurality of "kits" within a library and/or reporting module of the ICD-T 110. The user workspace module 245 may allow for the generation of the server simulator default response. According to an exemplary embodiment of the ICD-T 110, the workspace modules may feature resource membership. In other words, the workspace modules may allow for users 160 to apply resource rights to logical user communities. User communities may include, for example, business units, test groups, program architects, etc. Accordingly, the users 160 may create, assign, share, and otherwise manage membership to these groups/units. Furthermore, the resources provided to the group/unit members may be items created by other member-users of the ICD-T 110. These resources may include test cases, test suites, test case endpoints, simulator reactions, simulated business scenario modeling, simulated business scenario data, etc.

In addition to the workspace modules, the ICD-T 110 may include a data pack module 255. The data pack module 255 may allow the user 160 to edit the default server response for each of the interface methods. Furthermore, the data pack module 255 may support advance interface data management. For example, the user 160 may be provided with advanced two-phase data validation and support capabilities to assist the user 160 during the creation of test data. This two-phase validation may ensure that the data is schema-compliant, as well as compliant to any other specifications, such as proprietary interface definition template ("IDT") specifications. The IDT specifications may allow for interface authors/creators to provide greater detail pertaining to the specification. These details may include valid values, author notes, usage instructions, provider-to-client relationships, additional program details, etc.

The modules of the ICD-T 110 may further include one or more simulators, such as, for example, a client simulator execution module 265, a server simulator execution module 275. For instance, the client simulator execution module 265 may provide the user 160 with capabilities to test an interface across simulated technologies such as Simple Object Access Protocol ("SOAP") over Hypertext Transfer Protocol ("HTTP") Web Service, Restful Web Service, Enterprise JavaBeans ("EJB"), Transaction Language 1, ("TL1"), SOAP over Java Message Service ("JMS") Web Service, DataGate, etc. Therefore a collection of tests may be grouped together in a suite that may be invoked to simulate actual client usage.

The client simulator execution module 265 may track detailed invocation history of individual test cases and test suites. The tracked details may include success status, request data, response data, as well as any dependencies defined for a test suite. The testing of suites may allow for data to passed from one invocation response to a following invocation request in order to simulate real system behavior.

In addition, the client simulator execution module 265 may allow the user 160 to model advanced business cases and logical flow. Using the client simulator execution module 265, the user 160 may create interface simulation modules supporting various standards and non-standard based technologies (e.g., SOAP over HTTP Web Service, Restful Web Service, EJB, TL1, SOAP over JMS Web Service, DataGate, etc.) More specifically, the user 160 may leverage created scenario modules in order to create multiple scenarios backed by correlated data. These correlated data scenarios may provide interface-dependent clients with an environment to perform integration tests on a complete flow-through prior to the completion of the interface. In other words, the performance integration tests may be executed immediately, without requiring any developer intervention.

Accordingly, these simulators may be created in a language such as Web Services Description Language ("WSDL") within one or more interface agreements ("IA"). An IA may be defined as a versioned contract between the user 160 and a provider application that describes input/output characteristics of the provider application. In other words, the simulators (e.g., the client simulator execution module 265 and the server simulator execution module 275) may be a software component that mimics the behavior of another software component. The simulators may be a client simulator (e.g., a "test client") or a server simulator. Accordingly, the simulators may return a given set of response messages for a set of request messages from the user 160 or from the provider system. Furthermore, the simulators may be built directly from the IA, and thus may serve as an independent quality check to ensure that code was built in adherence to specific design documentation.

The modules may further include a reporting module, such as an interface system of record ("ISR") module 285 to provide the user community with an interface system of record library. The interfaces within the ISR module 285 may be grouped in a program-specific context in order to allow for easy and logical navigation. In addition, interface details may be exposed for public consumption whereby an interface client may educate him/herself prior to involving others. Furthermore, interface operations and field specifics may be queried and exported to excel for offline discussion.

Accordingly, the ISR module 285 may be a global location, common to allow users (e.g., user 160, administrator 170, etc.) of the ICD-T 110, wherein each of the loaded simulators and active scenarios may be accessed and viewed. Specifically, the ISR module 285 may contain a set of simulator reactions and IAs in which the user 160 may copy into his or her workspace. In addition, the ISR module 285 may provide reference to scenario maps, simulator log files, interface designs, artifacts, etc. For example, the ISR module 285 may provide the user 160 with a read-only view of simulator and scenario, similar to the user's workspace view. Furthermore, the user 160 may bookmark and share reactions from the ISR module 285, and subsequently edit the reactions for the user's own specific customize testing.

The reactions within the ISR module 285 may be viewed and edited in multiple formats, such as XML and pseudocode/form. Accordingly, the user 160 may view, copy, edit, create, and publish test scenarios and associate the required simulators and reactions. In other words, the ISR module 285 may allow for community sharing of workspace created reactions and scenarios from the user 160 and other users. For instance, the user 160 may create test scenarios in a client simulator and initiate single and multiple transactions to a real system. Accordingly, these test scenarios may be published to the ISR module 285 and accessed and edited by any other user.

The modules may further include a business-networking module 295 to alert the user 160 of any interface changes and any social and/or business networking updates. In other words, the business-networking module 295 may provide the user 160 with social/business networking capabilities. These capabilities may include Really Simple Syndication ("RSS") data feeds. RSS may be defined as a family of web-based feed formats used to publish frequently updated works, such as updated entries, news headlines, etc., in a standardized format. Accordingly, the RSS feed of business-networking module 295 may allow the users 160 to subscribe to ICD-T events with which they are concerned. Therefore, an RSS feed may eliminate excessive e-mail notifications to ICD-T community members when each event occurs, thereby reducing any unwanted alerts (e.g., "spam") and ensuring that notifications are limited to respective subscriber-members.

The capabilities of the business-networking module 295 may also include integration with a web-based messaging service, such as a web-based instant messaging ("IM") application. An IM application may be defined as form of real-time communication between two or more users based on typed text, wherein the text is transmitted via devices connected over a network. Accordingly, the IM application of business-networking module 295 may allow the users 160 to quickly interact with one another via instant message (e.g., "chat") concerning the resources managed by the ICD-T 110.

The capabilities of the business-networking module 295 may further provide the user 160 with resource "direct link" to Uniform Resource Locators ("URLs") on the web. Direct linking may be defined as the use of a linked object from a first site into a web page belonging to a second site. Accordingly, through resource direct link URL, the business-networking module 295 may enable the ICD-T 110 to open the linked object (e.g., the URL) for the users 160 in the context they request the direct link.

The GUI 140 may provide the user 160 with a workspace view, and as well as viewable access to ISR module 285 of the ICD-T 110. In other words, the GUI 140 may be a portal for the user 160 to view, manipulate, and share resources. Initially, the GUI 140 may be used to prompt the user 160 for login information (e.g., user ID, email address, password, etc.) In addition, the GUI 140 may display scenario maps, simulator log files, interface designs, artifacts, etc. referenced from the ISR module 285.

According to an exemplary embodiment of the system 100, the GUI 140 may be driven by logic that simply displays an essential view of the interface structure to the user 160, thereby removing much of the complexity of working with large structures. The user 160 has the ability to dynamically assign keys to the request message that may identify an appropriate response. Accordingly, the ICD-T 110 may verify that there are no conflicts. Thus, through the GUI 140, the system 100 provides the user 160 with the functionality to reference interfaces, design interfaces, generate code, test interfaces, as well as create testing scenarios.

As will be described in greater detail below, the workspace portion of the GUI 140 allows the user 160 to browse and the simulators and/or scenarios of the ISR module 285. For example, the GUI 140 may include a resource browser, wherein the user 160 may select a resource to view and manipulate. Accordingly, the user 160 may browse by simulator to find reactions and test cases organized by operation. In addition, the user 160 may browse by scenario to find steps and associated reactions and simulators. The GUI 140 may include a plurality of icons within the workspace to navigate to objects within the simulators or scenarios and initiate reaction controls (e.g., copy, edit, delete, save, publish, etc.). According to the exemplary embodiments of the system 100, the GUI 140 may allow the user 160 to easily build a bank of test data, without any knowledge of software languages (e.g., XML, XSD, WSDL, etc.). Furthermore, the GUI 140 may include a message center, wherein the user 160 may be notified of the results of actions and of any errors.

The admin portal 150 may contain portlets for allowing the administrator 170 to manage both the user(s) 150 and the simulators. Specifically, the admin portal 150 may include a user-management portlet, wherein the administrator 170 may add and delete users from the system 100. Furthermore, the administrator 170 may adjust the access privileges and/or the role for the user 160 within the system 100. For example, the role of the user 160 may define access rights and privileges of the user 160 within the system 110. The admin portal 150 may also include a simulator portlet, wherein the administrator 170 may register and modify the simulators within the system 100. For example, the administrator 170 may review a list of available simulators, may start or stop any one of the simulators, may modify the agreements of the simulators, may set one of the simulators to active or inactive, etc.

FIG. 2 shows an exemplary method 200 for designing and certifying user interfaces of a web-based application according to an exemplary embodiment of the present invention. The method 200 will be discussed with reference to ICD-T 110 and components of the system 100 of FIG. 1, according to an exemplary embodiment of the present invention. It should be noted that method 200 is merely an exemplary embodiment of the steps and processes performed by the ICD-T 110. Accordingly, any number of steps within the method 200 may be repeated or omitted or performed in any sequence. In other words, the methods performable by the ICD-T 110 are not limited to the steps 210-290 as illustrated in FIG. 2, nor the order/arrangement of the steps 210-290 as illustrated in FIG. 2.

Beginning with step 210, the method 200 may receive login information from the user 160. As described above, the ICD-T 110 may include the login module 215 for ensuring that the user 160 exists on a database of the system 100. For example, the user 160 may provide the login module 215 with login information, such as a user name, an email address, a password, etc. Once the user 160 is logged into the system 100, the login module 215 may register the web server with a security platform (e.g., a common security platform ("CSP")). This security platform may then implement an authentication service.

In step 220, the method 200 may receive registration information from the user 160. As noted above, the ICD-T 110 may include the registration module 225 to allow the user 160 to self-register with a user profile in an inactive state. The registration module 225 may notify the administrator 170 (e.g., via email) that a new user 160 has registered within the system 100 to use the ICD-T 110. In addition, the registration module 225 may allow the administrator 170 to approve the user 160 and activate the user profile. The registration module 225 may then notify the user 160 (e.g., via email) that the user 160 and profile (e.g., the user account) is ready for usage. Finally, the registration module 225 may assign the user 160 with a transport for use. For example, the user 160 may be assigned a HTTP transport that consists of a unique port. Alternatively, the user 160 may be assigned a JMS transport that consists of two new queues configured on a local JMS broker.

In step 230, the method 200 may receive a kit selection from the user 160. As noted above, the ICD-T 110 may include the global workspace module 235 for searching and displaying a plurality of "kits" within the ISR module 285. According to the exemplary embodiments of the present invention, a kit may be defined as a packaged software component that includes a client simulator and a server simulator, test data files, and an interface agreement of a provider web service. The global workspace module 235 may find all kits that have been created on server, such as an Interface Agreement Repository and Test System ("IARTS") server.

The global workspace module 235 may display these kits, sorted by application name, interface, method, etc., to the user 160 over the GUI 140. In addition, the global workspace module 235 may search the ISR module 285 for specific interfaces by keywords within notes, method name, data element name, etc. Furthermore, the global workspace module 235 may search and view the client simulator execution module 265 and the server simulator execution module 275 and data packs of other users, as well as browse the interface repository and view a specific interface. Accordingly, the global workspace module 235 may allow the user 160 to select and copy a kit from the global workspace to the user's local workspace. For instance, the user's local workspace may include all of the resources owned by the user 160, as well as those resources shared by the user 160.

In step 240, the method 200 may generate a server simulator default response. As noted above, the ICD-T 110 may include the user workspace module 245 for generating the server simulator default response. Specifically, when the kit is copied into the local workspace of the user 160, a simulator default response may be generated for each interface method, if a response for that method does not already exist.

In step 250, the method 200 may receive user changes to the default response and validate the changes. As noted above, the ICD-T 110 may include the data pack module 255 for allowing the user 160 to edit the default server response for each of the interface methods. In other words, the data pack module 255 may allow the user 160 to create, update, and delete data packs for interface methods in the local workspace. The user 160 may identify request message keys and values that may trigger the data pack response. In addition, the user 160 may define the necessary response timeouts and delays, and specify secondary response messages in addition to primary responses in order to simulate an asynchronous response. Furthermore, the user 160 may clone existing data packs for quick and efficient editing.

According to the exemplary embodiments of the present invention, the data pack module 255 may also enforce XSD schema. Specifically, the data pack module 255 may validate the data pack at the fields level, and display any validation errors to the user 160. It should be noted that when entering a test case, the data pack module 255 may allow the user 160 to disable the field validation in order to test sending negative request data through the client simulator.

In step 260, the method 200 may execute the client simulator using a test case. Specifically, the ICD-T 110 may include a client simulator execution module 265 for allowing the user 160 to execute their client simulator using a previously stored test case, or alternatively, using a newly created test case. Accordingly, the client simulator execution module 265 may display the response from the web service. If an error occurred, or if no response was received back form the service, the client simulator execution module 265 may analyze whether the provider application consumed the request. The client simulator execution module 265 may provide the user 160 with the ability to save the response into the local workspace, as well as the ability to change the location of the provider web service. In addition, the client simulator execution module 265 may display the user's repository of previously run tests in order to allow the user 160 to easily access the test and run the test individually or in batch for regression purposes.

In step 270, the method 200 may execute the server simulator. Specifically, the ICD-T 110 may include a server simulator execution module 275 for providing a status of the server simulator for each of the selected interfaces. In other words, the server execution module 275 may display to the user 160 whether the server simulator for the selected interface is running or not. In addition, the server execution module 275 may display the user's SOAP transport information for the server simulator. Since the user 160 may only have one SOAP transport available to him, only one user server simulator may be running at a given time. Accordingly, the server execution module 275 may also allow for the user 160 to start or stop their server simulator from running. Furthermore, the server execution module 275 may display a log file from the server simulator that is currently running.

In step 280, the method may provide a certification report. Specifically, the ICD-T 110 may include a reporting module 285 for displaying a certification report showing all of the interfaces that have been exercised successfully by the user 160. In addition, the reporting module 285 may provide the user 160 with time stamps for each of these successfully exercised interfaces.

In step 290, the method 200 may identify and alert the user 160 of any interface changes, as well as alert the user 160 of any social and/or business networking updates. Specifically, the ICD-T 110 may include the business-networking module 295 for detecting when a new version of an existing kit has been created on the IARTS server. As described above, the business-networking module 295 provides the ICD-T 110 with several capabilities to improve the business process. These capabilities may include, but are not limited to, various "push technologies," such as RSS feeds, IM applications, direct link to URL, etc. Push technology, or server push, may be described a style of web-based communication wherein the request for a given transaction originates with the publisher or central server. In contrasted to pull technology, wherein the request for the transmission of information originates with the receiver or client.

In addition, the business-networking module 295 may provide alerting services. For instance, the business-networking module 295 may find each of the users 160 that had previously copied one of the simulators (e.g., the client simulator execution module 265, the server simulator execution module 275, etc.) to the user's local workspace and notify the user 160 (e.g., via email) of the newer version. It should be noted that this notification may be an optional preference, as set forth by the user 160. Accordingly, if the user 160 specified this preference, the business-networking module 295 may display an alert box on the GUI 140 upon the next user login to inform the user 160 of the interface change.

According to the exemplary embodiments of the present invention, the ICD-T 110 and the method 200 may allow a user to easily build up a bank of test data with minimal knowledge of software technologies (e.g., XML, XSD, WSDL, etc.). Furthermore the ICD-T 110 and the method 200 may provide a level of field validation that exceeds the contract (e.g., field lengths, expected values of key/value structures, etc.) specified in standard software languages. The ICD-T 110 and the method 200 may allow the user 160 to execute centrally located simulators (e.g., the client simulator execution module 265, the server simulator execution module 275, etc.) without installing any software on their local workspace. The ICD-T 110 and the method 200 may further provide meaningful insight when any errors occur within the simulators.

As described above, the ICD-T 110 may allow the user 160 to reference an interface between two systems and view that interface in various views (e.g., XML view, table format view, pseudocode/form view, etc.), wherein these views may include interface history and interface artifacts. The ICD-T 110 provides the user 160 with the ability to design new interfaces or enhancements to existing interfaces within an online community environment of the web-based ICD-T 110. Furthermore, the ICD-T 110 may enforce integration through standards during this design process in order to assist the user 160 and ensure compliance. The ICD-T 110 may include "wizards" to guide the user 160 through creating new operations and/or elements. The ICD-T 110 may allow the user 160 to search for common fields and elements in the architecture of the system 100 and to select (e.g., drag and drop) the element onto the user's interface. Therefore, the user 160 may bring all the appropriate properties and meta-data associated with the selected element. The ICD-T 110 may allow the user 160 to change management and history of the interface, as well as generate an interface XML schema and/or an interface WSDL from the design. The user 160 may be allowed to generate customized simulators based on WSDLs uploaded from the user's local workspace. Finally, the ICD-T 110 may certify the interface though testing with generated standards based on the simulators.

According to one exemplary embodiment of the present invention, an exemplary interface certification and design tool may refer to an application tool including a user interface being executed by a processor and displayed on a display. Specifically, the user interface may receive a selection of one of a plurality of packaged software components from a user. As described above, the packaged software components may include any number of a plurality of simulators, test data files, interface agreements of a provider web service, etc. Furthermore, the application tool may also include a number of modules, such as, for example, at least one user workspace module generating a simulator default response, a data pack module validating user changes to the simulator default response to create a validated test file, an execution module executing the at least one simulator using the validated test file, and a business-networking module providing the user with business networking communications on a subscription basis.

In addition, the application tool may include a record module, wherein the record module may receive an interface search query from the user. This search query may include search criteria, such as, for example, at least one of an interface operation and field specifics. The record module may then search a plurality of packaged software components within a library based on the received interface search query. Furthermore, the record modules may provide at least one of the packaged software components to the user workspace module.

According to the exemplary embodiments of the present invention, one embodiment of the application tool may be a defined system implemented within a hardware device, a software component, or any combination thereof. One exemplary embodiment of the system may include a computer-readable storage medium, such as a memory, a processor, a plurality of executable software modules, and any number of input and/or output devices. The executable software modules may be stored on the storage medium and may be executed by the processor. Exemplary output devices may include displays, monitors, graphical user interfaces, etc. Exemplary input devices may include such examples as a keyboard, a mouse, a touch screen, a tablet, etc.

The system may include a means for receiving a selection of one of a plurality of packaged software components from a user. As noted above, the packaged software components including at least one of a plurality of simulators, test data files, and interface agreements of a provider web service. For example, this means for receiving the selection may be incorporated as a function of the user interface. The system may include a means for generating a simulator default response, such as, a workspace module. The system may include a means for validating user changes to the simulator default response to create a validated test file, such as, a data pack module. The system may include a means for executing the at least one simulator using the validated test file, such as an execution module. The system may include a means for publishing the validated test file, such as a publishing module, wherein other users have access to the published validated test file. The system may further include a means for generating a business networking communications service on a subscription basis, such as a business networking module, wherein the other users include subscribers to the business networking communications service.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A non-transitory computer readable storage medium including a set of instructions that are executable by a processor to cause the processor to perform operations comprising:
    receive, from a user, a selection of one of a plurality of packaged software components, the selected packaged software component including one of a plurality of simulators, test data files, and interface agreements of a provider web service;
    generating a simulator default response to a test case for the selected packaged software component;
    receiving user changes to the simulator default response to test the case;
    validate the user changes to the simulator default response to the test case to create a validated test file, wherein the validating ensures that the test file is compliant with an XML schema and compliant with proprietary interface definition template (IDT) specifications;
    executing a test case using the selected simulator and the validated test file; and
    publishing the validated test file, wherein other users have access to the published validated test file.

2. The non-transitory computer readable storage medium according to claim 1, wherein the operations further comprise:
    generating a business networking communications service on a subscription basis, wherein the other users include subscribers to the business networking communications service, the business networking communications service is one of an Really Simple Syndication data feed, an instant messaging application, and a resource direct link to Uniform Resource Locator.

3. The non-transitory computer readable storage medium according to claim 1, wherein the operations further comprise;
    receiving an interface search query from the user, the query including one of an interface operation and field specifics;
    searching the plurality of packaged software components within a library based on the received interface search query; and
    copying and displaying a returned one of the packaged software components based on the search to a user workspace module.

4. The non-transitory computer readable storage medium according to claim 3, wherein the simulator default response is generated by the user workspace module.

5. The non-transitory computer readable storage medium according to claim 1, wherein the plurality of simulators includes a client simulator and a server simulator.

6. The non-transitory computer readable storage medium according to claim 1, wherein the operations further comprise:
    certifying successful execution of one of the interface agreements; and
    displaying a certification report showing all of the interface agreements that have been exercised successfully by the user.

7. The non-transitory computer readable storage medium according to claim 1, wherein the validated test file may be validate in a simulated technology including Simple Object Access Protocol over Hypertext Transfer Protocol Web Service, Restful Web Service, Enterprise JavaBeans, Transaction Language 1, and Simple Object Access Protocol over Java Message Service Web Service.

8. The non-transitory computer readable storage medium according to claim 1, wherein the validated test file includes one of a test case, a test suite, a test case end point, a simulator reaction, a simulated business scenario model, and simulated business scenario data.

9. The non-transitory computer readable storage medium according to claim 1, wherein the validating further assists the user during a creation of the test file.

10. A system, comprising:
    a memory including a set of instructions; and
    a processor executing the test of instructions to perform operations comprising:
        receiving a selection of one of a plurality of packaged software components from a user, the packaged software components including one of a plurality of simulators, test data files, and interface agreements of a provider web service;
        generating a simulator default response to a test case;
        receiving user changes to the simulator default response to the test case;
        validating the user changes to the simulator default response to the test case to create a validated test file, wherein the validating user changes ensures that the test file is compliant with an XML schema and compliant with proprietary interface definition template (IDT) specifications;
        executing a test case using the selected simulator and the validated test file; and
        publishing the validated test file, wherein other users have access to the published validated test file.

11. The system according to claim 10, wherein the operations further comprise:
    generating a business networking communications service on a subscription basis, wherein the other users include subscribers to the business networking communications service, the business networking communications service is one of a Really Simple Syndication data feed, an instant messaging application, and a resource direct link to Uniform Resource Locator.

12. The system according to claim 10, wherein the operations further comprise:
receiving an interface search query from the user, the query including one of an interface operation and field specifics, searching a plurality of packaged software components within a library based on the received interface search query, and providing one of the packaged software components to a user workspace module.

13. The system according to claim 10, wherein the plurality of simulators includes a client simulator to simulate real system behavior and track invocation history of individual test cases and test suites, wherein the history includes one of a success status, a request data, a response data, a dependency defined for a test suite.

14. The system according to claim 10, wherein the plurality of simulators includes a server simulator providing a status of the server simulator for each selected interface.

15. The system according to claim 10, wherein an interface system of record module certifies successful execution of one of the interface agreements, and provides a certification report showing all of the interface agreements that have been exercised successfully by the user.

16. The system according to claim 10, wherein the validated test file may be validated in a simulated technology including Simple Object Access Protocol over Hypertext Transfer Protocol Web Service, Restful Web Service, Enterprise JavaBeans, Transaction Language 1, and Simple Object Access Protocol over Java Message Service Web Service.

17. The system according to claim 10, wherein the test file includes one of a test case, a test suite, a test case end point, a simulator reaction, a simulated business scenario model, and simulated business scenario data.

18. The system according to claim 10, wherein the validating further assists the user during a creation of the test file.

19. A system, comprising:
a computer-readable memory including executable modules; and
a processor executing the executable modules to:
receive, from a user, a selection of one of a plurality of packaged software components, the selected packaged software component including one of a plurality of simulators, test data files, and interface agreements of a provider web service;
generate a simulator default response to a test case for the selected packaged software component;
receive user changes to the simulator default response to the test case;
validate the user changes to the simulator default response to the test case to create a validated test file, wherein the validating ensures that the test file is compliant with an XML schema and compliant with proprietary interface definition template (IDT) specifications;
execute a test case using the selected simulator and the validated test file; and
publish the validated test file, wherein other users have access to the published validated test file.

20. The system according to claim 19, wherein the processor executes a further executable module to:
generate a business networking communications service on a subscription basis, wherein the other users include subscribers to the business networking communications service, the business networking communications service one of a Really Simple Syndication data feed, an instant messaging application, and a resource direct link to Uniform Resource Locator.

* * * * *